Patented Dec. 16, 1924.

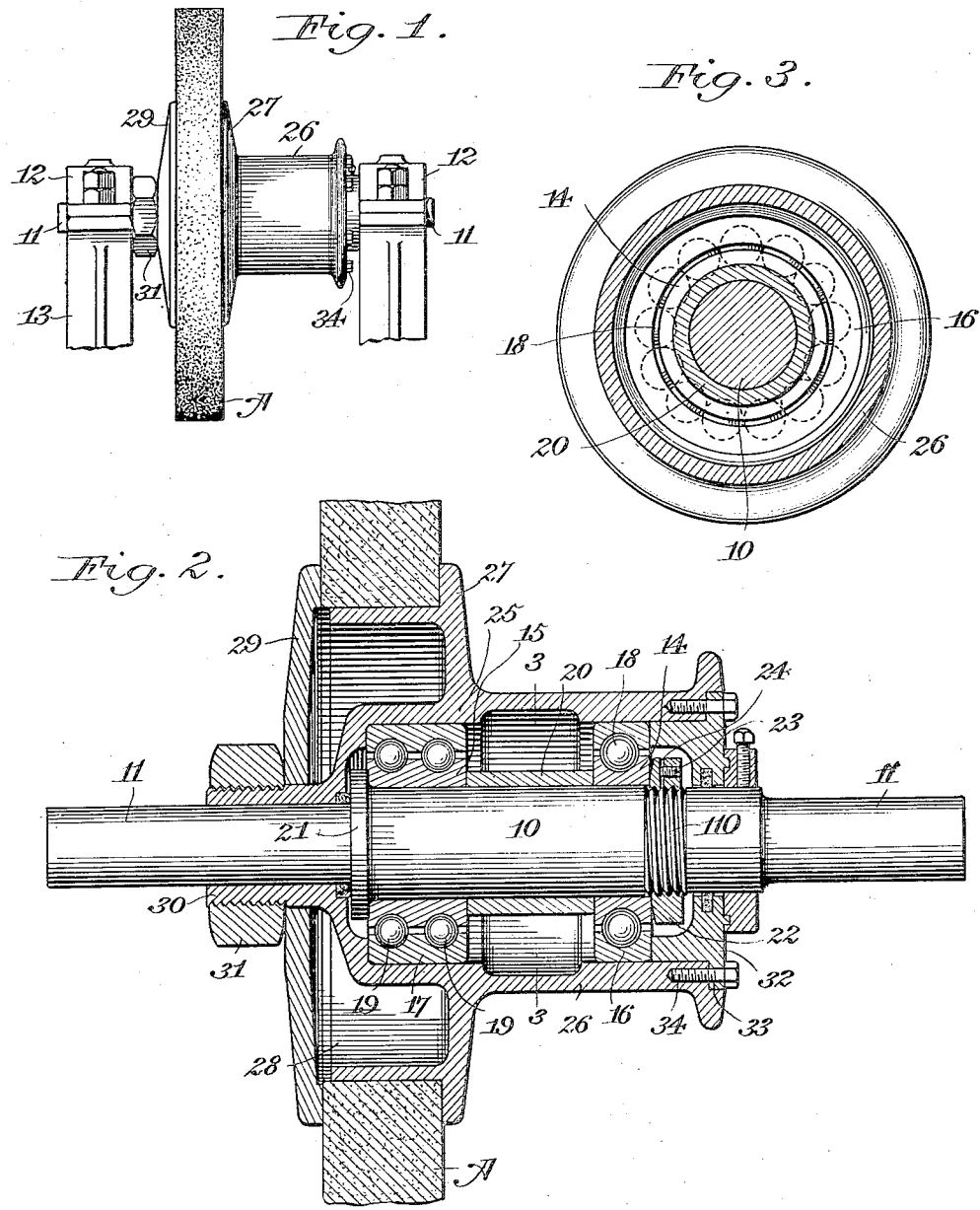

1,519,921

UNITED STATES PATENT OFFICE.

JURGEN P. LANGE, OF PASSAIC, NEW JERSEY.

SPINDLE FOR GRINDERS.

Application filed March 17, 1924. Serial No. 699,928.

*To all whom it may concern:*

Be it known that I, JURGEN P. LANGE, a citizen of the United States of America, and a resident of Passaic, in the county of Passaic and State of New Jersey, have invented a new and Improved Spindle for Grinders, of which the following is a description.

My invention relates to a spindle for grinders and particularly to a ball bearing spindle.

The general object of my invention is to provide a spindle assemblage including a head to carry the abrasive wheel and having means to receive and clamp the abrasive wheel in position, said head having such relation to bearing elements provided within the planes of the head as to substantially center the head and wheel, thereby decreasing the overhang load of the wheel.

An object of the invention also is to provide a spindle and bearing assemblage equipped with wheel-holding members of a character to permit of the changing of the wheel for substituting one of different size without disturbing the bearings or permitting dirt to enter the bearings.

The manner in which the above and other objects are attained will clearly appear as the description proceeds.

Reference is to be had to the accompanying drawings forming a part of this specification, it being understood that the drawings are merely illustrative of one example of the invention.

Figure 1 is a side elevation of a spindle, bearing and wheel-holding assemblage embodying my invention showing the same mounted for use;

Figure 2 is an enlarged longitudinal section;

Figure 3 is a transverse section.

In the illustrated example of my invention the numeral 10 indicates the spindle having trunnions 11 held by clamps 12 on a suitable frame or support; a portion of standards 13 being shown for the purpose. On the spindle 10 are a fixed bearing ring 14 and distant therefrom a fixed bearing ring 15. Coacting with the ring 14 is an outer ring 16 and coacting with the fixed ring 15 is an outer ring 17, the rings 14 and 16 forming a race for balls 18 and the rings 15 and 17 forming races for two annular series of balls, 19. The rings 14 and 15 are held separated by a spacing sleeve 20 on the spindle 10. At one end the bearing assemblage engages against a collar 21 on spindle 10 and at the opposite end of the assemblage is a ring nut 22 engaging a threaded zone 110 on the spindle 10 and serving to bind the rings 14, 15 and the intermediate sleeve 20 between said ring nut 22 and the collar 21. The nut 22 is locked to the spindle 10 through the medium of a screw 23 entering said nut parallel with the spindle 20 at a split portion 24 of said nut, the split being in the plane of the nut.

A shell designated generally by the numeral 25 is provided outside of and extending beyond the described bearing assemblage. Said shell includes a pulley 26 and a wheel-holding head comprising a fixed flange 27 on the shell at one side of the wheel and an adjustable clamping flange or disk 29 at the opposite side of the wheel, said flange 27 having a hub 28 to be received in the eye or hole of the wheel A. The disk or flange 29 fits over a nipple 30 on the shell 25 at one end, said nipple for a portion of its length being threaded to receive a clamp nut 31. At the opposite end of the shell 25 an end cap 32 is employed fitting within said shell and having a flange 33 secured to the adjacent end of the shell 25 by screw bolts 34.

By removing nut 31 and head 32 the shell 25 may be removed and the various parts otherwise disassembled. The removing of the nut 31 alone and with it the clamp disk 29 permits of the wheel A being removed and another substituted.

It will be seen from Figure 2 that the head carrying the wheel A is centered with respect to one of the annular series of bearing balls 19 which series is essentially or approximately at the medial plane of the head, that is to say, central between the planes of the flange 27 and disk 29 and adjacent the medial plane of the wheel A, thereby minimizing the overhang load of the wheel on the spindle.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. In a grinder, a spindle adapted to be supported at its ends, a bearing assemblage, said bearing assemblage comprising elements fixed on the spindle, bearing elements concentric with and turnable relatively to the first elements, annular series of balls between the fixed and turnable bearing elements, a shell constituting a broad pulley at one end, a flange rigid with the shell, and clamp means adapted to co-act with said flange for binding a grinding wheel between the two, one of said annular series of balls disposed in a plane medial between said flange and clamp means, another of said annular series of balls being in a plane adjacent to the opposite end of the shell.

2. In a grinder, a spindle, a bearing element rigid with the spindle, means to hold a grinding wheel, a bearing element within said wheel-holding means and turnable relatively to said rigid element, an annular series of ball bearings between said bearing elements and approximately in the medial plane of said wheel-holding means.

3. In a grinder, a spindle, bearing elements on said spindle, a sleeve interposed between said bearing elements, means to bind said bearing elements and sleeve in rigid relation to the spindle, bearing elements turnable on the first elements, ball bearings interposed between the first and second bearing elements, and a shell outside of the bearing elements; together with means at one end of the shell to detachably clamp an abrasive wheel.

JURGEN P. LANGE.